United States Patent
Hammer et al.

(10) Patent No.: US 6,485,802 B1
(45) Date of Patent: Nov. 26, 2002

(54) COATED FIBER-REINFORCED CASING BASED ON CELLULOSE HYDRATE SUITABLE FOR SMOKED LIVER SAUSAGE

(75) Inventors: Klaus-Dieter Hammer, Mainz (DE); Gerhard Grolig, Moerfelden-Walldorf (DE); Bernd-Adolf Lang, Wiesbaden (DE); Hans-Werner Seelgen, Niedernhausen-Oberjosbach (DE)

(73) Assignee: Kalle Nalo GmbH & Co.KG

( * ) Notice: Subject to any disclaimer, the term of this patent is extended or adjusted under 35 U.S.C. 154(b) by 0 days.

(21) Appl. No.: 09/527,592

(22) Filed: Mar. 17, 2000

(30) Foreign Application Priority Data

Mar. 18, 1999 (DE) .......................................... 199 12 052

(51) Int. Cl.⁷ .......................... A22C 13/00; B65D 81/34
(52) U.S. Cl. ..................... 428/34.8; 428/34.3; 426/105; 426/129
(58) Field of Search ......................... 428/34.8; 426/105, 426/129; 138/118.1

(56) References Cited

U.S. PATENT DOCUMENTS

| | | | |
|---|---|---|---|
| 1,678,632 A | 7/1928 | Briggs ........................ 426/118 |
| 2,181,886 A | 12/1939 | Goodman .................... 99/176 |
| 2,961,323 A | 11/1960 | Underwood et al. .......... 99/176 |
| 3,794,515 A | 2/1974 | Turbak et al. ............... 117/145 |
| 4,287,217 A | 9/1981 | Hammer et al. ............. 426/105 |
| 4,390,569 A | 6/1983 | Heinrich et al. ............. 427/366 |
| 4,525,397 A | 6/1985 | Chiu ........................... 428/36 |
| 4,529,634 A | 7/1985 | Hammer et al. .............. 428/36 |
| 5,316,809 A | 5/1994 | Hammer et al. ............. 428/348 |
| 5,364,674 A | * 11/1994 | Saal et al. .................. 428/34.8 |
| 5,536,620 A | * 7/1996 | Dueber et al. ........... 430/284.1 |

FOREIGN PATENT DOCUMENTS

| | | |
|---|---|---|
| DE | 2313994 | 10/1973 |
| DE | 2657833 | 6/1978 |
| DE | 2933131 | 2/1981 |
| DE | 3240847 | 11/1982 |
| EP | 0391358 | 10/1990 |

* cited by examiner

*Primary Examiner*—Shrive P. Beck
*Assistant Examiner*—Elena Tsoy
(74) *Attorney, Agent, or Firm*—Connolly Bove Lodge & Hutz LLP

(57) ABSTRACT

The invention relates to a seamless, tubular sausage casing based on cellulose hydrate having a continuous coating made of a polymeric material on its outer surface, which is permeable to hot smoke and cold smoke. The coating preferably has a thickness of from 3 to 10 μm and can also comprise or consist of a plurality of individual layers. The coating can be applied by conventional coating processes, and in addition also by single or repeated whole-surface printing. The casing is adapted especially for smoked liver sausage.

16 Claims, No Drawings

COATED FIBER-REINFORCED CASING BASED ON CELLULOSE HYDRATE SUITABLE FOR SMOKED LIVER SAUSAGE

BACKGROUND OF THE INVENTION

1. Field of the Invention

The present invention relates to a seamless, tubular sausage casing based on cellulose hydrate having a continuous coating made of a polymeric material on its outer surface. The casing is particularly useful for liver sausage.

2. Description of Related Art

Coated tubular cellulose hydrate sausage casings are generally known. For example a casing according to DE-A 32 40 847 is furnished on the outside with a fungicidal coat. It includes the reaction product of a cationic polymer based on polyamine, polyamide and epichlorohydrin with an alkali metal salt, alkaline earth metal salt or ammonium salt of propionic acid, sorbic acid, ascorbic acid, benzoic acid, 4-hydroxybenzoic acid, 4-chlorobenzoic acid or 4-methoxybenzoic acid. A seamless, tubular casing based on cellulose hydrate having a coating on the outside and on the inside is disclosed, for example in EP-A 001 545 and U.S. Pat. No. 4,287,217. The inner coating includes a thermoplastic material and is virtually impermeable to water and water vapor. The outer coating, in contrast, is permeable to water and water vapor and comprises an elastic copolymer, preferably an acrylate or methacrylate copolymer or a butadiene, isoprene or chloroprene copolymer. It does not form a closed coat and therefore has no barrier action either. It is produced by applying an emulsion which comprises the copolymer in the form of particles having a diameter of up to 0.08 μm and is subsequently dried. The weight of the outer coating is generally from 0.5 to 8.0 g/m². Because the impermeable inner coating the casing is not smoke-permeable, a sausage produced using such a casing cannot be smoked.

A sausage casing that has an oxygen barrier layer and water vapor barrier layer on its outside or inside is described in EP-A 457 178. The barrier layer consists essentially of a copolymer based on monomers of the formula $H_2C=CR^1-X$, where $R^1$ is a hydrogen atom or a methyl group and X is $O-CO-(C_1-C_{20})$alkyl or $CO-O-(C_1-C_{20})$alkyl. The copolymer, moreover, can further contain units of (meth) acrylic acid or (meth)acrylonitrile. Particular preference is given to copolymers of butyl acrylate, methyl methacrylate and acrylic acid. The barrier layer forms a closed coat and has a weight per unit area of at least 12 g/m², preferably at least 14 gm². The barrier properties or such a casing virtually approach those of a polyvinylidene chloride (PVDC) layer. This casing is also impermeable to smoke.

For unsmoked liver sausage, customarily casings having a high barrier action to oxygen and water vapor are used, since the liver sausage emulsion is particularly sensitive to atmospheric oxygen and dries out relatively easily. Oxidation is recognizable by a green discoloration of the emulsion surface, while drying out is recognizable by a brown discoloration. When casings having particularly effective barrier layers are used (in particular those having PVDC layers), there is generally only a low risk of discoloration and loss of weight by drying out.

Previously, fiber-reinforced cellulose hydrate casings have generally been used for smoked liver sausage. In addition, collagen casings or natural casings have also been used. Liver sausage casings made of acrylate-coated fabric which are sewn up to make tubes are also known. All of these casings are permeable to smoke, but also to oxygen and water vapor. As a consequence, the liver sausage emulsion in these casings becomes discolored, even after only a few days and thus loses quality.

SUMMARY OF THE INVENTION

An object of the present invention was therefore to provide a seamless, tubular casing for smoked liver sausage.

The present application thus relates to a seamless, tubular sausage casing comprising cellulose hydrate, wherein the casing has a continuous coating of a polymeric material on its outer surface, and wherein the coating is permeable to hot smoke and cold smoke and the coating preferably has a thickness of from 3 to 10 μm.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

DETAILED DESCRIPTION OF A PREFERRED EMBODIMENT

A casing according to the present invention should generally be resistant to boiling water and hot steam, permeable to hot smoke and cold smoke, and sufficiently impermeable to oxygen and water vapor so that the sausage can be stored for at least 3 to 5 days in a cold room before it is enclosed by a second packaging. In addition a casing of the instant invention should generally reduce or prevent as far as possible the sausage from drying out. In addition, a casing of the present invention should generally protect liver sausage emulsion (or other contents therein) against the action of light and should preferably not affect the fat/protein equilibrium, so that substantially no fat separates out from the emulsion. Not least, the casing should advantageously fit tightly and without creasing and should be able to be peeled off readily without tearing or having a tendency toward tear propagation. For ecological reasons, the casing should in addition also be substantially or completely free from chlorine-containing compounds, such as PVDC. The simultaneous solution of all these objects has previously been thought to be impossible. However, it has now been found that many or all of the above may be solved by employing a thin outer coating made of a synthetic polymer or copolymer.

The coating preferably comprises a homopolymer or copolymer consisting of or comprising units of monomers of the formula $H_2C=CR^1-X$, where $R^1$ is a hydrogen atom or a methyl group and X is $O-CO-R^2$ or $CO-O-R^2$, where $R^2$ is $(C_1-C_{10})$alkyl, preferably $(C_1-C_5)$alkyl.

In addition, units of other vinyl monomers may be present in the polymer coating if desired for any reason. The content of these other units, if included, is generally up to 45% by weight, preferably up to 30% by weight, in each case based on the total weight of the polymer. The other vinyl monomers are preferably those of the formula $H_2C=CR^1-X$, where X is OH, $CO_2H$, $CO-NH-(C_1-C_{10})$alkyl or CN. The content of (meth)acrylic acid units and of (meth) acrylonitrile units is generally relatively small. For example, in the case of (meth)acrylic acid units, the content is preferably from 0.1 to 20% by weight, more preferably from 0.5 to 10% by weight, and in the case of (meth)acrylonitrile units, preferably from 0.1 to 35% by weight, more preferably from 1.0 to 20% by weight, in each case based on the total weight of the polymer. Other suitable vinyl monomers include unsubstituted or substituted styrenes, ($C_2$–$C_8$) alkenes (especially ethylene or propylene) and/or conjugated ($C_4$–$C_{10}$)alkadienes (especially butadiene or isoprene). Using polyfunctional compounds, in particular polyfunctional aziridines, the (meth)acrylate polymers may be crosslinked and/or otherwise linked to the cellulose surface. The term "(meth)acrylate" in this context means "acrylate and/or methacrylate". The same applies to "(meth) acrylic acid", "(meth)acrylamide", "(meth)acrylonitrile" etc.

The polymer is preferably hydrophilic. Its mean molecular weight $M_w$ is preferably relatively large, i.e. advantageously greater than 200,000, preferably greater than 500,000. Polyesterurethanes are also suitable, and may be prepared for example from a polyesterdiol, a chain extender and a diisocyanate or triisocyanate. The polyesterdiols are preferably formed in this case from an unbranched ($C_3$–$C_{10}$) diol (especially butane-1,4-diol or hexane-1,6-diol) and a ($C_3$–$C_8$) dicarboxylic acid, (especially adipic acid). Suitable chain extenders can comprise, inter alia, diols and diamines, such as hexamethylenediamine. The diisocyanate or triisocyanate is preferably hexamethylene diisocyanate, bis(4-isocyanatocyclohexyl)methane, diphenylmethane 4,4'-diisocyanate or naphthalene 1,4–, 1,5- or 2,6-diisocyanate.

In a preferred embodiment, the coating may additionally contain one or more dyes and/or pigments which protect the emulsion against the action of light. Suitable dyes and/or pigments therefore absorb light in the visible region of the spectrum, and preferably also absorb UV radiation. The pigments can be of any type such as an inorganic or organic type. However, preference is given to organic pigments, for example azo pigments (for example, an azo pigment available under the name ®Novofil from Clariant Deutschland GmbH).

The inclusion or one or more dyes and/or pigments serve in particular for achieving the ochre or yellowish-brown color typically associated with liver sausage casings. The content of the pigments and/or dyes, if included, is generally from 0.5 to 12.0% by weight, more preferably from 1.0 to 6.0% by weight, in each case based on the total weight of the nonvolatile constituents of the coating. The outer coating can optionally further comprise customary additives in subsidiary amounts (together up to about 10% by weight, based on the total weight of the coating) as long as these additives do not materially affect the permeability of the casing for hot or cold smoke. For example, a wax, preferably in an amount of up to 5% by weight, based on the total weight of the coating, or aluminum silicate (kaolin), preferably in an amount of up to 3% by weight, based on the total weight of the coating, can reduce or prevent a flattened and rolled up casing from sticking together. Furthermore, additives which increase the surface roughness of the casing may be employed. On a casing having a rough surface the end clip is held in position much better. For this purpose e.g. a PVC latex or a crosslinked acrylate resin may be employed, preferably in an amount of up to 3% by weight, based on the total weight of the coating.

On the inside, the casing of the invention is preferably not coated or impregnated. However, if a coating or impregnation is imparted on an interior surface of the casing, it is highly desirable and in some instances imperative that the impregnation and/or coating not impair the smoke permeability of the casing.

The outer coating may be produced by any process which is generally familiar to those skilled in the art. For instance, it is possible to apply a solution of the polymeric material in an organic solvent (preferably ethanol, ethyl acetate, propyl acetate or ethyl lactate) onto the cellulose hydrate casing and then remove the solvent. Polyester urethanes are particularly suitable for this coating process. As an alternative, an aqueous dispersion of the polymeric material may also be used.

To apply the coating, a flattened tubular casing can be conducted through a bath containing the described solution or dispersion. The thickness of the coating may be regulated, for example, by adjusting the roller gap and/or by using an air knife. The coating is preferably dried and thereby solidified in a hot-air drier, as described for example, in DE-A 30 12 064, which is incorporated herein by reference. It is also possible to apply the outer coating onto an inflated casing via a ring nozzle and an air knife. Solidification and drying can then be performed as described according to any technique.

It has proven to be particularly simple and inexpensive to apply the coating by full-surface printing. A flexographic printing process is particularly suitable in some instances. The printing can optionally be repeated once or several times; thus the coating can comprise or consist of a plurality of individual layers which, if appropriate, have the same or different compositions. Thus the dyes and/or pigments are not necessarily present in all individual layers. The total thickness of the outer coating is preferably from 4 to 8 μm, particularly preferably from 4 to 6 μm. It is generally desirable and often important that the coating be uniform and free from streaks.

The cellulose hydrate base material can comprise a fiber reinforcement if desired which preferably comprises or consists of hemp fibers. The viscose can be applied to the fiber reinforcement in any manner such as from the outside, from the inside or from both sides (so-called externally, internally or double viscose-treated casings). The casing according to the present invention generally comprises more than 60% by weight, preferably more than 80% by weight, in particular more than 90% by weight, of cellulose, based on the weight of the casing. The fiber reinforcement preferably also consists of a cellulose material, such as hemp fibers.

The uncoated cellulose casing advantageously has, at 23° C. and 85% relative humidity (RH), a water vapor permeability of 1,700 to 2,000 g per square meter and day (determined in accordance with DIN 53 122) and a permeation at 40 bar of 105 to 110 l per square meter and day. The oxygen permeability at 23° C. and 85% RH is advantageously 200 to 220 $cm^3$ per square meter and day at an internal pressure of 1 bar, at 23° C. and 53% RH as little as only 15 to 20 $cm^3/m^2$ d bar (determined in accordance with DIN 53 380). The casing of the invention shows a considerably higher barrier values. Thus, at 23° C. and 85% RH its water vapor permeability is advantageously 800 to 1200 $g/m^2$ d, its permeation at 40 bar is 75 to 100 $1l/m^2$ d and its oxygen permeability is 150 to 170 $cm^3/m^2$ d bar at 23° C. and 85% RH and 8 to 12 $cm^3/m^2$ d bar at 23° C. and 53% RH.

These barrier properties are generally sufficient for the liver sausages after cooking and smoking, to be stored for 4 to 7 days under coldroom conditions (2° C., 75% relative humidity) without their discoloring, greatly losing weight or deteriorating in other ways. The casing of the invention is generally equally highly permeable to hot smoke and cold smoke. "Hot smoke" has a temperature of about 30 to 80° C. when acting on the casing, whereas "cold smoke" has a temperature of less than 30 ° C. when impinging on the casing. The weight loss is of the liver sausages produced using the casing of the invention can be, when cooked in a typical steam cabinet, only 0.8 to 1.2%, whereas weight loss is generally 8 to 10% in the case of liver sausages cooked in uncoated cellulose casings. In the case of cooking in the kettle and subsequent cold smoking, the weight loss can be only 0.8 to 1.2%, compared with 3.5 to 5% in the case of the liver sausages in uncoated casings. After a few days, the liver sausages can be provided with a second packaging as is customary in the art.

Hitherto it has always been assumed that, when the water vapor and oxygen barrier properties are increased, the barrier to smoke flavor and aroma substances also increases accordingly. However, surprisingly, this is not so with the casings of the present invention. It is assumed that the flavor and aroma substances dissolve in the polymeric material and thus migrate through the casing. Thus, the flavor and aroma are therefore virtually transported via a bridge mechanism through the polymer coating.

In the examples below, percentages are percentages by weight, unless stated otherwise.

EXAMPLE 1

An externally viscose-treated, unpigmented fiber casing of caliber 40 having a flat width of 60 mm was printed on the whole surface three times on both sides in the flexographic printing process. In the first printing, a 2 $\mu$m thick layer of
- 95% unpigmented, modified acrylate base polymer (90 WD 013 from Schmidt-Druckfarben, Frankfurt) and
- 5% polyfunctional aziridine crosslinker (90 LG 973-WD from Schmidt-Druckfarben) was applied.

In the second step, a 2 $\mu$m thick layer of
- 40% of an unpigmented, modified acrylate base polymer (90 WD 013),
- 40% of a white-pigmented dispersion 10 WD 015 from Schmidt-Druckfarben,
- 10% of a yellow-pigmented dispersion 20 WD 017,
- 5% of an orange-pigmented dispersion 20 WD 018 and
- 5% of crosslinker 90 LG 973-WD was likewise applied.

Finally, a 1.5 $\mu$m thick layer of
- 70% of yellow-pigmented dispersion 20 WD 017,
- 22% of red-pigmented dispersion 30 WD 015-2
- 3% of black-pigmented dispersion 80 WD 013 and
- 5% crosslinker 90 LG 973-WD was applied.

The barrier values of the seamless sausage casing thus produced were:
- Water vapor permeability: 915 g/m$^2$ d
- Oxygen permeability at 23° C. and 53% RH: 10 cm$^3$/m$^2$ d bar
  ditto at 85% RH: 160 cm$^3$/m$^2$ d bar
- Permeation at 40 bar 90 l/m$^2$ d The casing thus printed was stuffed with liver sausage emulsion, the sausage was then cooked in the steam cabinet or in the kettle and cold-smoked. The following weight decreases were observed during this:
- after cooking in the steam cabinet: 0.8%
  and subsequent cold smoking: 2.2%
- after cooking in the kettle: 0.5%
  and subsequent cold smoking: 1.7%

After storage for 5 days in the cold room (6–8° C., 80% RH), no discoloration of the emulsion surface was observable. In the second packaging added after this time, the liver sausage could be stored for several weeks.

EXAMPLE 2

On an externally viscose-treated fiber casing of caliber 45 having a flat width of 73 mm, 3 layers were applied in the flexographic printing process, more precisely initially a 1.5 [|g]mm thick layer of
- 95% unpigmented acrylate base polymer 90 WD 013 and
- 5% of crosslinker 90 LG 973-WD;

then a 2 $\mu$m thick layer of
- 70% of yellow-pigmented dispersion 20 WD 017,
- 22% of red-pigmented dispersion 30 WD 015,
- 3% of black-pigmented dispersion 80 WD 013 and
- 5% of crosslinker 90 LG 973-WD.

The 3rd layer was identical in composition to the 1st layer, but its thickness was 3 $\mu$m.

The barrier values of the printed cellulose-based fiber casing were as follows:
- Water vapor permeability: 880 g/m$^2$ d
- Oxygen permeability at 23° C. and 53% RH: 8 cm$^3$/m$^2$ d bar
  ditto at 85% RH: 120 cm$^3$/m$^2$ d bar
- Permeation at 40 bar: 78 l/m$^2$ d The casing was then, as in Example 1, stuffed with liver sausage emulsion, cooked and cold smoked. The decrease in weight was
- after cooking in the steam cabinet: 0.6%
  and subsequent cold smoking: 2.1%
- after cooking in the kettle: 0.5%
  and subsequent cold smoking: 1.5%.

After storage for five days in the cold room, the color of the emulsion surface was unchanged. In a second packaging the liver sausage could be stored without problems for 8 weeks.

EXAMPLE 3

Onto the outside of an externally viscose-treated, ochre-colored, tubular cellulose hydrate fiber casing of caliber 55 having a flat width of 86 mm, before entry into the drier, a 1.25% strength polyamine-polyamide-epichlorohydrin resin solution was applied (roller application). The gel tube was then dried as usual, set to the desired residual moisture content ("conditioned") and wound up.

The flattened tube was then conducted through a vat which contained an aqueous dispersion of the following composition:
- 0.750 kg of glycerol,
- 0.125 kg of kaolin (®Glomax JDF),
- 0.650 kg of Ca stearate (®Lubranil CA 50 from S üddeutsche Emulsions-Chemie GmbH, Mannheim),
- 1.000 kg of PVC latex,
- 1.500 kg of paraffin wax emulsion (Michem Lube ML 182 from Michelman Intl. & Co., Norway),
- 25.000 kg of styrene-butadiene-acrylic acid copolymer (®Styrofan DS 2306 from BASF AG) and
- 25.000 kg of demineralized water.

The thickness of the outer coating was set by regulating the roller gap to about 6 $\mu$m. The tube thus coated then passed through a vertically disposed hot-air drier. After conditioning with steam, the sausage casing was wound up.

The properties of the casing (water vapor permeability and oxygen permeability, permeation, weight losses after stuffing) were virtually the same as for the casings according to Examples 1 and 2.

The priority document, German Patent Application No. 199-12-052.8 filed Mar. 18, 1999 is incorporated herein by reference in its entirety.

As used herein and in the following claims, articles such as "the", "a" and "an" can connote the singular or plural.

All documents referred to herein are specifically incorporated for reference in their entireties.

What is claimed is:

1. A seamless, tubular sausage casing based on cellulose hydrate, said casing having a continuous polymeric coating on an outer surface thereof, wherein the thickness of the coating is from 3 to 10 μm, and the casing is permeable to hot smoke and cold smoke, wherein the water vapor permeability of said casing at 23° C. and 85% RH is from 800 to 1200 g/m² d, the permeation at 40 bar of said casing is from 95 to 100 l/m² d and the oxygen permeability of said casing is from 150 to 170 cm³/m² d bar at 23° C. and 85% RH and from 8 to 12 cm³/m²d bar at 23° C. and 53% RH.

2. A sausage casing as claimed in claim 1, wherein the coating comprises a homopolymer or copolymer consisting of or comprising units of monomers of the formula $H_2C=CR^1-X$, where $R^1$ is a hydrogen atom or a methyl group and X is $O-CO-R^2$ or $CO-O-R^2$, where $R^2$ is $(C_1-C_{10})$alkyl.

3. A sausage casing as claimed in claim 2, where $R^2$ is $(C_1-C_5)$alkyl.

4. A sausage casing as claimed in claim 2, wherein the copolymer additionally comprises units of monomers of the formula $H_2C=CR^1-X$, where $R^1$ is a hydrogen atom or a methyl group and X is OH, $CO_2H$, $CO-NH-(C_1-C_{10})$ alkyl or CN, of unsubstituted or substituted styrenes, of $(C_2-C_8)$alkenes and/or of conjugated $(C_4-C_{10})$alkadienes.

5. A sausage casing as claimed in claim 4, wherein the content of the additional units is up to 45% by weight, based on the total weight of the polymer.

6. A sausage casing as claimed in claim 5, wherein said content is up to 30% by weight.

7. A sausage casing as claimed in claim 1, wherein the coating comprises polyesterurethanes.

8. A sausage casing as claimed in claim 1, wherein the thickness of the coating is from 3 to 10 μm.

9. A sausage casing as claimed in claim 1, wherein the thickness of the coating is from 4 to 8 μm.

10. A sausage casing as claimed in claim 1, wherein the coating comprises a plurality of individual layers.

11. A sausage casing as claimed in claim 10, wherein the coating consists of a plurality of individual layers.

12. A sausage casing as claimed in claim 1, wherein the coating or at least one layer thereof comprises dyes and/or pigments.

13. A sausage casing as claimed in claim 1, wherein the cellulose hydrate base material comprises a fiber reinforcement.

14. A sausage casing as claimed in claim 13, wherein the fiber reinforcement comprises or consists of hemp fibers.

15. A sausage casing as claimed in claim 13, wherein the viscose is applied to the fiber reinforcement from the outside, from the inside or from both sides.

16. A method for preparing a smoked liver sausage comprising forming a sausage casing according to claim 1 and providing smoked liver therein.

* * * * *